United States Patent [19]

Yamakawa et al.

[11] Patent Number: 5,036,026

[45] Date of Patent: Jul. 30, 1991

[54] SINTERED BODY OF ALUMINUM NITRIDE AND METHOD FOR PRODUCING THE SAME

[75] Inventors: Akira Yamakawa; Hitoyuki Sakanoue; Hisao Takeuchi, all of Itami, Japan

[73] Assignee: Sumitomo Electric Industries, Ltd., Osaka, Japan

[21] Appl. No.: 588,475

[22] Filed: Sep. 25, 1990

Related U.S. Application Data

[63] Continuation of Ser. No. 236,942, Aug. 26, 1988, abandoned.

[30] Foreign Application Priority Data

| Aug. 28, 1987 | [JP] | Japan | 62-212939 |
| Aug. 28, 1987 | [JP] | Japan | 62-212940 |
| Aug. 28, 1987 | [JP] | Japan | 62-212941 |
| Aug. 28, 1987 | [JP] | Japan | 62-212942 |
| Aug. 28, 1987 | [JP] | Japan | 62-212943 |
| Aug. 28, 1987 | [JP] | Japan | 62-212944 |
| Aug. 28, 1987 | [JP] | Japan | 62-212945 |
| Sep. 1, 1987 | [JP] | Japan | 62-216431 |

[51] Int. Cl.$^5$ ............................................. C04B 35/58
[52] U.S. Cl. ..................................... 501/96; 501/98; 501/100
[58] Field of Search ........................... 501/96, 98, 100

[56] References Cited

U.S. PATENT DOCUMENTS

| 1,854,702 | 4/1932 | Laucks et al. | 106/91 |
| 2,110,053 | 5/1935 | Phillips | 106/91 |
| 2,521,073 | 9/1950 | Ludwig | 106/91 |
| 3,131,074 | 4/1964 | Thompson | 106/91 |
| 3,972,723 | 8/1976 | Balle et al. | 106/677 |
| 4,547,471 | 10/1985 | Huseby et al. | 501/98 |
| 4,556,426 | 12/1985 | Chesney, Jr. et al. | 106/90 |
| 4,578,365 | 3/1986 | Huseby et al. | 501/98 |
| 4,615,863 | 10/1986 | Inoue et al. | 501/96 |
| 4,618,592 | 10/1986 | Kuramoto et al. | 501/96 |
| 4,680,278 | 7/1987 | Inoue et al. | 501/92 |
| 4,746,637 | 5/1988 | Kasori et al. | 501/98 |
| 4,764,321 | 8/1988 | Huseby et al. | 501/98 |
| 4,803,183 | 2/1989 | Schwetz et al. | 501/96 |
| 4,948,429 | 8/1990 | Arfaei | 106/677 |

FOREIGN PATENT DOCUMENTS

| 0181849 | 5/1986 | European Pat. Off. | 106/91 |
| 3333406 | 3/1984 | Fed. Rep. of Germany . | |
| 3541398 | 6/1986 | Fed. Rep. of Germany . | |
| 2052180 | 8/1985 | Japan . | |

Primary Examiner—William R. Dixon, Jr.
Assistant Examiner—Sue Hollenbeck
Attorney, Agent, or Firm—Cushman, Darby & Cushman

[57] ABSTRACT

A sintered body of aluminum nitride having a density of not smaller than 3.1 g/cm$^3$, a coefficient of thermal conductivity of not smaller than 100 W/mk and preferably an average particle size of not larger than 5 μm, which comprises aluminum nitride as a main component, 0.01 to 10.0% by weight of at least one oxide selected from oxides of the IIa and IIIa elements of the Periodic Table, 2.0% by weight or less of oxygen which is not contained in the oxide of the IIa and IIIa element and 1.0% by weight or less of at least one impurity metal which is not the IIa or IIIa element which has good thermal conductivity.

5 Claims, No Drawings

SINTERED BODY OF ALUMINUM NITRIDE AND METHOD FOR PRODUCING THE SAME

This is a continuation of application Ser. No. 07/236,942, filed on Aug. 26, 1988, which was abandoned.

BACKGROUND OF THE INVENTION

1. Field of the Invention

The present invention relates to a sintered body of aluminum nitride with good thermal conductivity and a method for producing the same. More particularly, the present invention relates to a dense sintered body of aluminum nitride having a large coefficient of thermal conductivity of, for example, 100 W/mk or larger, improved superior electrical insulating property and dielectric property and a method for economically producing such sintered body of aluminum nitride.

2. Description of the Related Art

LSI is vigorously being improved and its degree of integration is greatly increased. To such improvement, increase of an IC tip size contribute, and calorific power per package increases as the IC tip size is increased. Due to the increased calorific power, heat radiation capacity of a substrate material becomes more important.

Since a sintered body of alumina which is conventionally used as an IC substrate has insufficient heat radiation because of its small coefficient of thermal conductivity, it cannot be accommodated with the increase of heat radiation from the IC chip. In place of the alumina substrate, a beryllia made substrate has been studied since it has good thermal conductivity. However, beryllia is highly toxic so that its handling is very troublesome.

Since aluminum nitride (AlN) inherently has a large thermal conductivity and an electrical insulating property and no toxicity, it is a highly attractive material as an electrically insulating packaging material in the semiconductor industry.

To produce a sintered body of AlN having large thermal conductivity, it is inevitable to make the sintered body highly pure and dense. To this end, several methods have been proposed. For example, Japanese Patent Kokai Publication No. 50008/1984 discloses a method comprising synthesizing AlN fine powder with high purity and molding and sintering it in conventional manners to obtain a sintered body of AlN having a coefficient of thermal conductivity of about 100 W/mk. Japanese Patent Kokai Publication No. 279421/1985 discloses a method comprising adding $Y_2O_3$ and carbon to AlN powder containing oxygen and sintering the resultant mixture to obtain a sintered body having a coefficient of thermal conductivity of 150 W/mk.

These conventional methods require various steps for synthesis, molding and sintering, since AlN is molded and sintered after synthesis of AlN powder. Increase of the number of process steps increases not only the chance of contamination of AlN with metallic impurities, for example, grinding steps but also the cost for producing the sintered body. The cost for the production of the AlN substrate is about 100 times the cost for producing the alumina substrate. In addition, since AlN is easily oxidized in the air or with water in a solvent, a content of oxygen inevitably increases during mixing, drying and storage.

Further, the coefficients of thermal conductivity of AlN achieved by the conventional methods are far smaller than the theoretical value of 320 W/mk for AlN.

SUMMARY OF THE INVENTION

One object of the present invention is to provide a dense sintered body of aluminum nitride having improved purity, an increased coefficient of thermal conductivity and electrically insulating property.

Another object of the present invention is to provide a method for economically producing such sintered body of aluminum nitride.

According to one aspect of the present invention, there is provided a sintered body of aluminum nitride having a density of not smaller than 3.1 g/cm$^3$, a coefficient of thermal conductivity of not smaller than 100 W/mk and preferably an average particle size of not larger than 5 μm, which comprises aluminum nitride as a main component, 0.01 to 10.0% by weight of at least one oxide selected from oxides of the IIa and IIIa elements of the Periodic Table, 2.0% by weight or less of oxygen which is not contained in the oxide of the IIa and IIIa element and 1.0% by weight or less of at least one impurity metal which is not the IIa or IIIa element.

According to another aspect of the present invention, there is provided a method for producing a sintered body of aluminum nitride which comprises steps of:

mixing alumina powder having a purity of not lower than 99.0% and an average particle size of not larger than 2 μm with 10 to 100 parts by weight, preferably 20 to 100 parts by weight of carbon or a compound which liberates carbon by heating in terms of carbon per 100 parts by weight of alumina and optionally 0.01 to 50 parts by weight, preferably 0.1 to 50 parts by weight of at least one additive selected from the group consisting of aluminum nitride powder, aluminum powder, compounds of the IIa and IIIa elements of the Periodic Table in terms of their oxide per 100 parts by weight of alumina, molding the mixture and sintering the molded mixture at a temperature of 1,600 to 2,200° C. in an atmosphere containing nitrogen.

According to a further aspect of the present invention, there is provided a method for producing a dense sintered body of aluminum nitride comprising steps of:

molding aluminum powder having a purity of not lower than 99.0% and an average particle size of not larger than 50 μm and sintering the molded aluminum powder at a temperature of 1,600 to 2,200° C. in an atmosphere containing nitrogen.

DETAILED DESCRIPTION OF THE INVENTION

According to the present invention, alumina used as the main raw material has a purity of not lower than 99.0%. When the purity of alumina is lower than 99.0%, the produced sintered body of aluminu nitride has unsatisfactorily low purity and in turn does not have good characteristics.

Alumina powder has an average particle size of not larger than 2 μm. When the average particle size of alumina powder is larger than 2 μm, nitriding and densification of the sintered body by heating are difficult.

According to the present invention, carbon or the compound which liberates carbon is used in an amount of 10 to 100 parts by weight, preferably 20 to 100 parts by weight, more preferably 25 to 35 parts by weight in terms of carbon per 100 parts by weight of alumina.

The reaction of the alumina powder and carbon proceeds according to the following reaction formula:

$$Al_2O_3 + 3C \rightarrow 2Al + 3CO$$

Assuming that the formed metal aluminum further reacts with nitrogen in the atmosphere to form aluminum nitride, the weight ratio of alumina to carbon is about 1:0.35. However, according to the study by the present inventors, it has been found that, when the weight ratio of alumina to carbon is from 1:0.1 to 1:1, the sintered body mainly comprising aluminum nitride is formed because of formation of suboxides of aluminum and the like.

As the carbon source, not only carbon powder but also the compound which liberates carbon by heating (e.g. phenol resins, imides, etc.) can be used. As the carbon powder, preferably low structure carbon powder is used to increase a green density. More preferably, graphite powder having a larger density than the usual carbon powder is used.

When aluminum nitride or aluminum powder is mixed with the raw material alumina powder, reduction and nitriding of alumina can be controlled so that it contributes to improvement of a yield and characteristics of the sintered body and to increase of density of the sintered body. Preferably, aluminum nitride or aluminum powder has an average particle size of not larger than 2 $\mu$m or 50 $\mu$m respectively and is used in an amount of 0.1 to 50 parts by weight, preferably 1 to 10 parts by weight per 100 parts by weight of alumina.

The compounds of the IIa, IIIA, and rare earth elements of the Periodic Table are used as sintering aids. Specific examples of the IIa and IIIa elements are Be, Mg, Ca, Sr, Ba, Sc, Y, La, Ce, Pr, Nd, Sm, Gd and Yb, and preferred examples of the compound of these elements are oxides (e.g. CaO, $Y_2O_3$), carbonates (e.g. $CaCO_3$, $Y_2(CO_3)_3$), halides (e.g. $CaF_2$, $YF_3$), organic compounds (e.g. calcium stearate, yttrium stearate), alkoxides, nitrides, carbides, carbonitrides and the like. The particle size of the compound is not larger than 2 $\mu$m. The compound is added to alumina in an amount of 0.01 to 50 parts by weight, preferably 0.1 to 50 parts by weight per 100 parts by weight of alumina. When the compound is added in an amount outside this range, the coefficient of thermal conductivity of the sintered body of aluminum nitride is not satisfactorily improved.

The aluminum powder to be sintered by the method of the present invention has an average particle size of not larger than 50 $\mu$m, preferably not larger than 10 $\mu$m. When the average size of aluminum powder is larger than 50 $\mu$m, it is difficult to nitride aluminum or to increase the density of the sintered body.

The aluminum nitride mixture or aluminum powder is molded by a conventional method (e.g. dry press, doctor blade, extrusion, slip casting, etc.).

The molded article is then sintered in an atmosphere containing nitrogen at a temperature of 1,600 to 2,200° C. The atmosphere can be a nitrogen-containing atmosphere. When the sintering temperature is lower than 1,600° C., the alumina or aluminum is not sufficiently converted to aluminum nitride and the sintered body does not have a sufficiently large density. When the sintering temperature is higher than 2,200° C, particles in the sintered body grow too large.

During sintering of the molded article, a large amount of nitrogen is absorbed by the article and carbon monoxide is generated. Therefore, the sintering is more easily carried out when a thickness of the molded article is smaller. For example, the molded article has a thickness of not larger than 1 mm. If the molded article has a thickness of larger than 2 mm, it is necessary to decrease the heating rate in a temperature range between 1,300° C. and 1,700° C. in which the reduction and nitridation occur.

The sintered body of aluminum nitride of the present invention has a density of not smaller than 3.1 g/cm$^3$. Since the density has influences on the mechanical properties such as strength and hardness, air tightness and corrosion resistance, when the density of the sintered body of aluminum nitride is smaller than 3.1 g/cm$^3$, all these properties are deteriorated.

PREFERRED EMBODIMENTS OF THE INVENTION

The present invention will be illustrated by following examples, in which "parts" and "%" are by weight unless otherwise indicated.

Example 1

To alumina having a purity of 99.9% and an average particle size of 0.4 $\mu$m (100 parts), carbon powder having an average particle size of 0.1 $\mu$m (25 parts) was added in the presence of water as a dispersion medium. After adjusting a viscosity of the mixture with a molding binder (PVA, 20 parts), the mixture was molded in the form of a sheet by using a doctor blade and punched to form a square piece of 30 mm in length, 30 mm in width and 0.8 mm in thickness.

The molded article was heated to 1,950° C. at a heating rate of 1° C./min. in a nitrogen stream at a flow rate of 10 liter/min. and kept at 1,950° C. for 3 hours to obtain a sintered body.

The sintered body was transparent to light and had a coefficient of thermal conductivity of 180 W/mk and an average particle size of 4 $\mu$m.

According to X-ray analysis, the sintered body consisted of aluminum nitride and its specific gravity was 3.22.

Example 2

Alumina having a purity of 99.99% and an average particle size of 0.6 $\mu$m (100 parts), phenol resin (28 parts in terms of carbon) and PVB (10 parts) as a binder were mixed in toluene (60 parts) to form a slurry. Then, the slurry was molded in the form of a sheet by using a doctor blade and punched to form a square piece of 30 mm in length, 30 mm in width and 0.8 mm in thickness.

The molded article was heated to 1,900° C. at a heating rate of 2° C./min. in a nitrogen stream at a flow rate of 20 liter/min. and kept at 1,900° C. for 6 hours to obtain a sintered body.

The sintered body had a coefficient of thermal conductivity of 190 W/mk.

Example 3

To alumina having a purity of 99.9% and an average particle size of 0.4 $\mu$m (100 parts), carbon black having an average particle size of 0.1 $\mu$m (25 parts) and aluminum nitride having an average particle size of 0.6 $\mu$m (20 parts) were added in the presence of toluene (120 parts) as a solvent and PVB (30 parts) as a binder to form a slurry. Then, the slurry was molded in the form of a sheet by using a doctor blade and punched to form a square piece of 30 mm in length, 30 mm in width and 0.8 mm in thickness.

The molded article was heated to 1,900° C. at a heating rate of 1° C./min. in a nitrogen stream at a flow rate of 10 liter/min. and kept at 1,900° C. for 3 hours to obtain a sintered body.

The sintered body was transparent to light and had a coefficient of thermal conductivity of 220 W/mk.

According to X-ray analysis, the sintered body consisted of a single phase of aluminum nitride and its specific gravity was 3.23.

Example 4

In the same manner as in Example 2 but using starting materials as shown in Table 1, a sintered body was produced. A purity and an average particle size of alumina were as follows:

Run Nos. 1–7:
Purity: 99.9%
Average particle size: 0.4 μm
Run No. 8:
Purity: 98%
Average particle size: 0.4 μm

TABLE 1

| Run No. | Alumina (parts) | Carbon black (parts) | Aluminum nitride powder (parts) | Density (g/cc) | K (W/mk) |
|---|---|---|---|---|---|
| 1* | 100 | 18 | 10 | 3.35 | 50 |
| 2 | 100 | 28 | 10 | 3.22 | 240 |
| 3 | 100 | 60 | 10 | 3.20 | 220 |
| 4* | 100 | 110 | 10 | 3.10 | 80 |
| 5* | 100 | 28 | 0 | 3.22 | 170 |
| 6 | 100 | 28 | 1 | 3.22 | 230 |
| 7 | 100 | 28 | 30 | 3.22 | 240 |
| 8* | 100 | 28 | 10 | 3.22 | 110 |

Note: *Comparative Examples.

Example 5

To alumina having a purity of 99.9 % and an average particle size of 0.4 μm (100 parts), carbon black having an average particle size of 0.1 μm (25 parts) and aluminum powder having an average particle size of 0.6 μm (20 parts) were added in the presence of toluene (100 parts) as a solvent and PVB (20 parts) and DBP (10 parts) as a binder to form a slurry. Then, the slurry was molded in the form of a sheet by using a doctor blade and punched to form a square piece of 30 mm in length, 30 mm in width and 0.8 mm in thickness.

The molded article was heated to 1,900° C. at a heating rate of 1° C./min. in a nitrogen stream at a flow rate of 20 liter/min. and kept at 1,900° C. for 3 hours to obtain a sintered body.

The sintered body was transparent to light and had a coefficient of thermal conductivity of 220 W/mk.

According to X-ray analysis, the sintered body consisted of a single phase of aluminum nitride and its specific gravity was 3.23.

Example 6

In the same manner as in Example 5 but using starting materials as shown in Table 2, a sintered body was produced. A purity and an average particle size of alumina were as follows:

Run Nos. 1–7:
Purity: 99.9%
Average particle size: 0.4 μm
Run No. 8:
Purity: 98%
Average particle size: 0.4 μm

TABLE 2

| Run No. | Alumina (parts) | Carbon black (parts) | Aluminum powder (parts) | Density (g/cc) | K (W/mk) |
|---|---|---|---|---|---|
| 1* | 100 | 18 | 10 | 3.35 | 50 |
| 2 | 100 | 28 | 10 | 3.22 | 240 |
| 3 | 100 | 60 | 10 | 3.20 | 220 |
| 4* | 100 | 110 | 10 | 3.10 | 80 |
| 5* | 100 | 28 | 0 | 3.22 | 170 |
| 6 | 100 | 28 | 1 | 3.22 | 230 |
| 7 | 100 | 28 | 30 | 3.22 | 240 |
| 8* | 100 | 28 | 10 | 3.22 | 110 |

Note: *Comparative Examples.

Example 7

To alumina having a purity of 99.9% and an average particle size of 0.4 μm (100 parts), carbon black having an average particle size of 0.1 μm (25 parts) and CaO powder having an average particle size of 0.2 μm (5 parts) were added in the presence of water (100 parts) as a dispersion medium and mixed, followed by adjustment of viscosity by the addition of PVA (20 parts) as a binder to form a slurry. Then, the slurry was molded in the form of a sheet by using a doctor blade and punched to form a square piece of 30 mm in length, 30 mm in width and 0.8 mm in thickness.

The molded article was heated to 1,950° C. at a heating rate of 1° C./min. in a nitrogen stream at a flow rate of 10 liter/min. and kept at 1,950° C. for 3 hours to obtain a sintered body.

The sintered body was transparent to light and had a coefficient of thermal conductivity of 220 W/mk and an average particle size of 4 μm.

According to X-ray analysis, the sintered body consisted of a single phase of aluminum nitride and its specific gravity was 3.23.

Example 8

Starting materials as shown in Table 3 were mixed in the presence of toluene (120 parts) as a solvent and PVB (30 parts) and DBP (10 parts) as a binder to form a slurry. Then, the slurry was molded in the form of a sheet by using a doctor blade and punched to form a square piece of 30 mm in length, 30 mm in width and 0.8 mm in thickness.

The molded article was heated to 1,900° C. at a heating rate of 2° C./min. in a nitrogen stream at a flow rate of 10 liter/min. and kept at 1,900° C. for 6 hours to obtain a sintered body. A purity and an average particle size of alumina were as follows:

Run Nos. 1–8 and 10–16:
Purity: 99.9%
Average particle size: 0.4 μm
Run No. 9:
Purity: 98%
Average particle size: 0.4 μm The results are shown in Table 3.

TABLE 3

| Run No. | Alumina (parts) | Carbon (parts*1) | Additive (parts*2) | Density (g/cc) | K (W/mk) |
|---|---|---|---|---|---|
| 1*3 | 100 | Carbon black (18) | CaO (3) | 3.35 | 30 |
| 2 | 100 | Carbon black (28) | CaO (3) | 3.22 | 230 |
| 3 | 100 | Carbon black (60) | CaO (3) | 3.20 | 210 |
| 4*3 | 100 | Carbon black (110) | CaO (3) | 3.10 | 80 |
| 5*3 | 100 | Carbon black (28) | None | 3.22 | 180 |
| 6 | 100 | ↑ | CaO (1) | 3.22 | 210 |
| 7 | 100 | ↑ | CaO (30) | 3.26 | 220 |
| 8*3 | 100 | ↑ | CaO (60) | 3.10 | 80 |
| 9*3 | 100 | ↑ | CaO (3) | 3.22 | 100 |
| 10 | 100 | Phenol resin & Carbon black (28) | CaO (3) | 3.22 | 220 |
| 11 | 100 | ↑ | $CaF_2$ (3) | 3.22 | 240 |
| 12 | 100 | ↑ | $CaCO_3$ (3) | 3.22 | 230 |
| 13 | 100 | ↑ | Ca Stearate (3) | 3.22 | 240 |
| 14 | 100 | ↑ | MgO (3) | 3.22 | 190 |
| 15 | 100 | ↑ | SrO (3) | 3.22 | 210 |
| 16 | 100 | ↑ | BaO (3) | 3.22 | 220 |

Note:
*1 Parts in terms of carbon.
*2 Parts in terms of a corresponding oxide.
*3 Comparative Examples.

Example 9

To alumina having a purity of 99.9% and an average particle size of 0.4 μm (100 parts), carbon black having an average particle size of 0.1 μm (25 parts) and $Y_2O_3$ powder having an average particle size of 0.2 μm (5 parts) were added in the presence of water (110 parts) as a dispersion medium and mixed, followed by adjustment of viscosity by the addition of PVA (30 parts) as a binder. Then, the mixture was molded in the form of a sheet by using a doctor blade and punched to form a square piece of 30 mm in length, 30 mm in width and 0.8 mm in thickness.

The molded article was heated to 1,900° C. at a heating rate of 1° C./min. in a nitrogen stream at a flow rate of 10 liter/min. and kept at 1,900° C. for 3 hours to obtain a sintered body.

The sintered body was transparent to light and had a coefficient of thermal conductivity of 220 W/mk and an average particle size of 4 μm.

According to X-ray analysis, the sintered body consisted of a single phase of aluminum nitride and its specific gravity was 3.23.

Example 10

Starting materials as shown in Table 4 were mixed in the presence of toluene (120 parts) as a solvent and PVB (30 parts) as a binder to form a slurry. Then, the slurry was molded in the form of a sheet by using a doctor blade and punched to form a square piece of 30 mm in length, 30 mm in width and 0.8 mm in thickness.

The molded article was heated to 1,900° C. at a heating rate of 2° C./min. in a nitrogen stream at a flow rate of liter/min. and kept at 1,900° C. for 6 hours to obtain a sintered body. A purity and an average particle size of alumina were as follows:

Run Nos. 1-8 and 10-16:
Purity: 99.9%
Average particle size: 0.4 μm
Run No. 9:
Purity: 98%
Average particle size: 0.4 μm The results are shown in Table 4.

TABLE 4

| Run No. | Alumina (parts) | Carbon (parts*1) | Additive (parts*2) | Density (g/cc) | K (W/mk) |
|---|---|---|---|---|---|
| 1*3 | 100 | Carbon black (18) | $Y_2O_3$ (3) | 3.35 | 30 |
| 2 | 100 | Carbon black (28) | $Y_2O_3$ (3) | 3.22 | 230 |
| 3 | 100 | Carbon black (60) | $Y_2O_3$ (3) | 3.20 | 210 |
| 4*3 | 100 | Carbon black (110) | $Y_2O_3$ (3) | 3.10 | 80 |
| 5*3 | 100 | Carbon black (28) | None | 3.22 | 180 |
| 6 | 100 | ↑ | $Y_2O_3$ (1) | 3.22 | 210 |
| 7 | 100 | ↑ | $Y_2O_3$ (30) | 3.26 | 220 |
| 8*3 | 100 | ↑ | $Y_2O_3$ (60) | 3.10 | 80 |
| 9*3 | 100 | ↑ | $Y_2O_3$ (3) | 3.22 | 100 |
| 10 | 100 | Phenol resin & Carbon black (28) | $Y_2O_3$ (3) | 3.22 | 220 |
| 11 | 100 | ↑ | $YF_3$ (3) | 3.22 | 240 |
| 12 | 100 | ↑ | $Y_2(CO_3)_3$ (3) | 3.22 | 230 |
| 13 | 100 | ↑ | Y stearate (3) | 3.22 | 240 |
| 14 | 100 | ↑ | $Ce_2O_3$ (3) | 3.22 | 220 |
| 15 | 100 | ↑ | $La_2O_3$ (3) | 3.22 | 230 |
| 16 | 100 | ↑ | $Sc_2O_3$ (3) | 3.22 | 230 |

Note:
*1 Parts in terms of carbon.
*2 Parts in terms of corresponding oxide.
*3 Comparative Examples.

Example 11

Alumina powder (A) having a purity of 99.99% or higher, an average particle size of 0.5 μm and properties as shown in Table 5 (100 parts) was mixed with carbon black powder having an average particle size of 0.1 μm (34 parts) and $CaCO_3$ powder having an average particle size of 0.2 μm (3 parts) in the presence of distilled water (110 parts) as a dispersion medium, followed by adjustment of viscosity by the addition of PVA (30 parts) as a binder. Then, the mixture was molded in the form of a sheet by using a doctor blade and punched to form a square piece of 65 mm in length, 65 mm in width and 1.1 mm in thickness.

The molded article was heated to 1,850° C. at a heating rate of 5° C./min. up to 1,300° C., 0.5° C./min. from 1,300 to 1,600° C. and 5° C./min. from 1,600 to 1,850° C. in a nitrogen stream under a pressure of one atm. and kept at 1,850° C. for 2 hours to obtain a sintered body.

The sintered body was transparent to light and had a coefficient of thermal conductivity of 170 W/mk, a specific gravity of 3.25 and an average particle size of 3 μm.

According to X-ray analysis, the sintered body consisted of a single phase of aluminum nitride.

The sintered body contained 0.15% of impurity Ca in terms of CaO, 0.5% of oxygen which cannot be assigned to CaO, and 10, 50, 10 and 100 ppm of Fe, Si, Na and total impurity metal elements, respectively.

Example 12

Alumina powder (B) having a purity of 99.8% or higher and an average particle size of 0.2 μm and properties as shown in Table 5 (100 parts) was mixed with graphite powder having an average particle size of 0.1 μm (29 parts), phenol resin having a residual carbon content of 50% (6 parts) and $Y_2O_3$ powder having an average particle size of 0.3 μm (0.7 parts) in the presence of ethanol (120 parts) as a solvent, followed by drying. Then, the mixture was molded by dry pressing to form a square piece of 33 mm in length, 33 mm in width and 0.9 mm in thickness.

The molded article was heated to 1,900° C. at a heating rate of 10° C./min. up to 1,300° C., 1° C./min. from 1,300 to 1,600° C. and 10° C./min. from 1,600 to 1,900° C. in a nitrogen stream under a pressure of one atm. and kept at 1,900° C. for 2 hours to obtain a sintered body.

The sintered body had a coefficient of thermal conductivity of 150 W/mk, a specific gravity of 3.26 and an average particle size of 4 μm.

According to X-ray analysis, the sintered body consisted of a single phase of aluminum nitride except $YAlO_3$.

The sintered body contained 0.5% of impurity Y in terms of $Y_2O_3$, 0.8% of oxygen which cannot be assigned to $Y_2O_3$ and 50, 100, 50 and 300 ppm of Fe, Si, Na and total impurity metal elements, respectively.

TABLE 5

| Alumina | A | B | C | D |
|---|---|---|---|---|
| Average particle size (μm) | 0.5 | 0.2 | <0.1 | 1.2 |
| Purity (%) | >99.99 | >99.8 | >99.9995 | >99.8 |
| Impurity | | | | |
| Fe | 20 | 100 | 8 | 100 |
| Si | 40 | 200 | 8 | 200 |
| Na | 10 | 300 | 3 | 300 |
| Total metals | <100 | <2,000 | <50 | <2,000 |

Example 13

Alumina shown in Table 5, carbon sources (carbon black and phenol resin) and a sintering aid as shown in Table 6 were mixed in ethanol. After drying, the mixture was molded by dry pressing to form a test piece of 33 mm in length, 33 mm in width and 0.9 mm in thickness.

Then, the test piece was sintered at a temperature shown in Table 6 for a period of time shown in Table 6 to obtain a sintered article.

To facilitate reduction and nitriding of alumina, the temperature was raised from 1,300 to 1,600° C. at a raising rate of 1° C./min.

TABLE 6

| Production conditions | | | Propeties of sintered body | | | | | | | | |
|---|---|---|---|---|---|---|---|---|---|---|---|
| Carbon source (pbw) | | | | | Thermal | Impurities (ppm) | | | | | Average particle |
| $Al_2O_3$ (pbw) | (Carbon black + Phenol resin) | Sintering aid (pbw) | Heating temp. × time | Density (g/cm³) | X-ray diffraction | conductivity (W/cm) | Aid*1 (%) | O*2 (%) | Fe | Si | Na | Total metals | size (μm) |
| A (100) | 30.0 + 8 | $Y_2O_3$ (0.7) | 1,900° C. × 2 hrs. | 3.26 | AlN $YAlO_3$ $Y_4Al_2O_9$ | 190 | 0.5 | 0.5 | 10 | 20 | 5 | <50 | 3 |
| A (100) | 30.0 + 8 | $CeO_2$ (1.0) | 1,900° C. × 2 hrs. | 3.27 | AlN $CeAl_3$ | 160 | 0.7 | 0.7 | 10 | 30 | 10 | <100 | 3 |
| A (100) | 30.0 + 8 | $Gd_2O_3$ (1.0) | 1,950° C. × 2 hrs. | 3.28 | AlN $GdAlO_3$ | 170 | 0.8 | 0.6 | 10 | 30 | 10 | <100 | 4 |
| A (100) | 30.0 + 8 | $Yb_2O_3$ (1.0) | 1,950° C. × 2 hrs. | 3.29 | AlN $YbAlO_3$ | 160 | 0.8 | 0.6 | 10 | 30 | 10 | <100 | 5 |
| A (100) | 30.0 + 8 | $Gd_2O_3$ (0.5) $Yb_2O_3$ (0.5) | 1,950° C. × 2 hrs. | 3.29 | AlN Unidentified phase | 170 | 0.4 0.4 | 0.6 | 5 | 30 | 10 | <70 | 4 |
| A (100) | 30.0 + 8 | $CaCO_3$ (3) | 1,850° C. × 2 hrs. | 3.25 | AlN | 180 | 0.20 | 0.3 | 5 | 25 | 5 | <50 | 3 |
| A (100) | 30.0 + 8 | $Y_2O_3$ (0.7) | 1,800° C. × 2 hrs. | 3.10 | AlN $Y_4Al_2O_9$ | 120 | 0.5 | 0.5 | 10 | 20 | 10 | <70 | 2 |
| A (100) | 30.0 + 8 | $Y_2O_3$ (0.7) | 2,000° C. × 2 hrs. | 3.27 | AlN $YAlO_3$ | 180 | 0.5 | 0.5 | 10 | 30 | 10 | <70 | 6 |
| A (100) | 30.0 + 8 | $Y_2O_3$ (0.7) | 2,100° C. × 2 hrs. | 3.27 | AlN $Y_4Al_2O_9$ | 200 | 0.4 | 0.3 | 5 | 20 | 5 | <50 | 8 |
| A (100) | 30.0 + 8 | $Y_2O_3$ (0.7) | 2,100° C. × 0.5 hr. | 3.26 | AlN $YAlO_3$ $Y_4Al_2O_9$ | 180 | 0.5 | 0.5 | 10 | 30 | 10 | <70 | 4 |
| A (100) | 5.0 + 8 | $Y_2O_3$ (0.7) | 1,900° C. × 2 hrs. | 3.39 | AlN AlON | 30 | 0.5 | 25 | 10 | 40 | 10 | <100 | 4 |
| A (100) | 30.0 + 8 | $Y_2O_3$ (0.7) | 1,900° C. × 2 hrs. | 3.33 | AlN AlON | 50 | 0.5 | 10 | 10 | 40 | 10 | <100 | 4 |
| A (100) | 20.0 + 8 | $Y_2O_3$ (0.7) | 1,900° C. × 2 hrs. | 3.29 | AlN $Y_3Al_5O_{12}$ | 100 | 0.5 | 2.1 | 10 | 40 | 10 | <100 | 3 |
| A (100) | 25.0 + 8 | $Y_2O_3$ (0.7) | 1,900° C. × 2 hrs. | 3.28 | AlN $YAlO_3$ | 150 | 0.5 | 1.1 | 10 | 30 | 5 | <70 | 4 |
| A (100) | 30.0 + 9 | $Y_2O_3$ (0.7) | 1,900° C. × 2 hrs. | 3.27 | AlN $Y_4Al_2O_9$ | 210 | 0.4 | 0.4 | 10 | 20 | 5 | <50 | 4 |
| A (100) | 30.0 + 10 | $Y_2O_3$ (0.7) | 1,900° C. × 2 hrs. | 3.24 | AlN $Y_2O_3$ | 210 | 0.4 | 0.2 | 5 | 20 | 5 | <50 | 3 |
| A (100) | 30.0 + 10 | $Y_2O_3$ (0.7) | 1,950° C. × 2 hrs. | 3.26 | AlN $Y_2O_3$ | 230 | 0.4 | 0.2 | 5 | 20 | 5 | <50 | 5 |
| A (100) | 30.0 + 10 | $Y_2O_3$ (0.7) | 1,950° C. × 2 hrs. | 3.26 | AlN $Y_2O_3$ | 230 | 0.4 | 0.2 | 5 | 20 | 5 | <50 | 5 |
| A (100) | 40.0 + 8 | $Y_2O_3$ | 1,900° C. × | 3.10 | AlN | 140 | 0.4 | 0.2 | 5 | 10 | 5 | <50 | 4 |

TABLE 6-continued

| Production conditions | | | | Propeties of sintered body | | | | | | | | |
|---|---|---|---|---|---|---|---|---|---|---|---|---|
| | Carbon source (pbw) | | | | | Thermal conduc- | Impurities (ppm) | | | | | Average particle |
| Al$_2$O$_3$ (pbw) | (Carbon black + Phenol resin) | Sinter- ing aid (pbw) | Heating temp. × time | Density (g/cm$^3$) | X-ray diffrac- tion | tivity (W/cm) | Aid*$^1$ (%) | O*$^2$ (%) | Fe | Si | Na | Total metals | size (μm) |
| | | (0.7) | 2 hrs. | | Y$_2$O$_3$ | | | | | | | | |
| B (100) | 30.0 + 8 | Y$_2$O$_3$ (0.7) | 1,900° C. × 2 hrs. | 3.27 | AlN YAlO$_3$ | 150 | 0.5 | 0.9 | 100 | 150 | 10 | <500 | 3 |
| B (100) | 30.0 + 8 | CaCO$_3$ (3) | 1,800° C. × 2 hrs. | 3.20 | AlN | 150 | 0.3 | 1.2 | 50 | 100 | 50 | <300 | 2 |
| B (100) | 30.0 + 8 | CaCO$_3$ (3) | 1,900° C. × 2 hrs. | 3.26 | AlN | 170 | 0.3 | 0.9 | 100 | 150 | 50 | <500 | 4 |
| C (100) | 30.0 + 8 | Y$_2$O$_3$ (0.7) | 1,700° C. × 2 hrs. | 3.15 | AlN YAlO$_3$ | 130 | 0.5 | 0.9 | 10 | 10 | 5 | <50 | 1 |
| C (100) | 30.0 + 8 | Y$_2$O$_3$ (0.7) | 1,800° C. × 2 hrs. | 3.20 | AlN YAlO$_3$ | 170 | 0.5 | 0.8 | 5 | 5 | 5 | <30 | 2 |
| C (100) | 30.0 + 8 | Y$_2$O$_3$ (0.7) | 1,900° C. × 2 hrs. | 3.26 | AlN YAlO$_3$ | 190 | 0.5 | 0.6 | 5 | 5 | 5 | <30 | 4 |
| C (100) | 30.0 + 8 | Y$_2$O$_3$ (3) | 1,800° C. × 2 hrs. | 3.28 | AlN Y$_4$Al$_2$O$_9$ | 200 | 2.3 | 0.7 | 5 | 5 | 5 | <30 | 3 |
| C (100) | 30.0 + 8 | Y$_2$O$_3$ (10) | 1,800° C. × 2 hrs. | 3.35 | AlN Y$_4$Al$_2$O$_9$ Y$_2$O$_3$ | 190 | 7.5 | 0.8 | 5 | 5 | 5 | <30 | 3 |
| C (100) | 30.0 + 8 | CaCO$_3$ (3) | 1,600° C. × 2 hrs. | 3.18 | AlN | 150 | 0.3 | 0.2 | 5 | 10 | 5 | <50 | 0.5 |
| C (100) | 30.0 + 8 | CaCO$_3$ (3) | 1,700° C. × 2 hrs. | 3.26 | AlN | 180 | 0.2 | 0.5 | 5 | 5 | N.D. | <30 | 1.5 |
| C (100) | 30.0 + 8 | CaCO$_3$ (3) | 1,800° C. × 2 hrs. | 3.26 | AlN | 200 | 0.2 | 0.3 | 5 | 5 | N.D. | <30 | 3 |
| C (100) | 30.0 + 8 | CaCO$_3$ (3) | 1,900° C. × 2 hrs. | 3.26 | AlN | 220 | 0.1 | 0.2 | 5 | 5 | N.D. | <30 | 5 |
| C (100) | 30.0 + 10 | Y$_2$O$_3$ (0.7) | 1,900° C. × 2 hrs. | 3.28 | AlN | 240 | 0.4 | 0.2 | 5 | 5 | N.D. | <30 | 4 |
| C (100) | 30.0 + 10 | CaCO$_3$ (2) Y$_2$O$_3$ (0.4) | 1,900° C. × 2 hrs. | 3.27 | AlN | 250 | 0.1 0.2 | 0.1 | 5 | 5 | N.D. | <20 | 4 |
| C (100) | 30.0 + 6 | CaCO$_3$ (2) Y$_2$O$_3$ (0.4) | 1,700° C. × 2 hrs. | 3.25 | AlN | 150 | 0.3 0.3 | 1.6 | 10 | 10 | 10 | <50 | 1 |

Note:
*$^1$In terms of the weight of corresponding oxide.
*$^2$A total amount of oxygen except that assigned to the sintering aid.

Example 14

Alumina powder (B) having a purity of 99.8%, an average particle size of 0.2 μm and properties as shown in Table 5 (100 parts) was mixed with carbon black powder having an average particle size of 0.1 μm (33 parts), aluminum powder having an average particle size of 5 μm (20 parts) and Y$_2$O$_3$ powder having an average particle size of 0.5 μm (1 part) in the presence of ethanol (140 parts) as a dispersion medium, followed by the addition of PVB (15 parts) as a binder. Then, the mixture was molded in the form of a sheet by dry pressing and punched to form a square piece of 33 mm in length, 33 mm in width and 0.9 mm in thickness. The molded article was heated to 1,900° C. at a heating rate of 10° C./min. up to 500° C., 2° C./min. from 500 to 1,500° C. and 10° C./min. from 1,500 to 1,900° C. in a nitrogen stream under a pressure of one atm. and kept at 1,900° C. for 3 hours to obtain a sintered body.

The sintered body had a coefficient of thermal conductivity of 170 W/mk, a specific gravity of 3.26 and an average particle size of 5 μm.

According to X-ray analysis, in addition to a peak corresponding to aluminum nitride, a peak corresponding to YAlO$_3$ was observed.

The sintered body contained 0.4% of impurity Y in terms of Y$_2$O$_3$, 0.5% of oxygen which cannot be assigned to Y$_2$O$_3$, and 50, 50, 20 and less than 200 ppm of Fe, Si, Na and total impurity metal elements, respectively.

Example 15

Alumina powder (A) having a purity of 99.99%, an average particle size of 0.5 μm and properties as shown in Table 5 (100 parts) was mixed with carbon black powder having an average particle size of 0.1 μm (34 parts) and CaCO$_3$ powder having an average particle size of 0.2 μm (3 parts) in the presence of distilled water (110 parts) as a dispersion medium, followed by adjustment of viscosity by the addition of PVA (30 parts) as a binder. Then, the mixture was molded in the form of a sheet by using a doctor blade and punched to form a square piece of 65 mm in length, 65 mm in width and 1.1 mm in thickness. The molded article was heated to 1,900° C. at a heating rate of 5° C./min. up to 1,300° C., 0.5° C./min. from 1,300 to 1,600° C. and 5° C./min. from 1,600 to 1,900° C. in a nitrogen stream under a pressure of one atm. and kept at 1,900° C. for 3 hours to obtain a sintered body.

The sintered body was transparent to light and had a coefficient of thermal conductivity of 180 W/mk and a specific gravity of 3.25.

According to X-ray analysis, the sintered body consisted of a single phase of aluminum nitride.

The sintered body contained 0.15% of impurity Ca in terms of CaO, 0.5% of oxygen which cannot be assigned to CaO, and 10, 50, 10 and 100 ppm of Fe, Si, Na and total impurity metal elements, respectively.

Example 16

A commercially available low soda alumina powder (D) having a purity of 99.8% or higher and an average particle size of 1.2 μm and properties as shown in above Table 5 (100 parts) was mixed with carbon black powder having an average particle size of 0.2 μm (30 parts), phenol resin having a residual carbon content of 50% (6 parts) and $Y_2O_3$ powder having an average particle size of 0.3 μm (0.7 parts) in the presence of ethanol (150 parts) as a dispersion medium followed by drying. Then, the mixture was molded by dry pressing to form a square piece of 33 mm in length, 33 mm in width and 0.9 mm in thickness.

The molded article was heated to 1,950° C. at a heating rate of 10° C./min. up to 1,300° C., 1° C./min. from 1,300 to 1,600° C. and 10° C./min. from 1,600 to 1,950° C. in a nitrogen stream under a pressure of one atm. and kept at 1,900° C. for 3 hours to obtain a sintered body.

The sintered body had a coefficient of thermal conductivity of 170 W/mk and a specific gravity of 3.26.

According to X-ray analysis, the sintered body consisted of a single phase of aluminum nitride except $YAlO_3$.

The sintered body contained 0.5% of impurity Y in terms of $Y_2O_3$, 0.5% of oxygen which cannot assigned to $Y_2O_3$ and 100, 100, 100 and 350 ppm of Fe, Si, Na and total impurity metal elements, respectively.

EXAMPLE 17

In the same manner as in Example 16, a sintered body was produced from a mixture shown in Table 7. The properties of the sintered body are also shown in Table 7.

TABLE 7

| Mixture | | | | Properties of sintered body | | | | | | | |
|---|---|---|---|---|---|---|---|---|---|---|---|
| $Al_2O_3$ (pbw) | Carbon source (pbw) (Carbon black + Phenol resin) | Sintering aid (pbw) | Solvent | Density (g/cm³) | X-ray diffraction | Thermal conductivity (W/cm) | Aid*1 (%) | O*2 (%) | Fe | Si | Na | Total metals |
| A (100) | 30.0 + 9 | $Y_2O_3$ (0.7) | Ethanol | 3.26 | AlN $Y_4Al_2O_9$ $Y_2O_3$ | 220 | 0.4 | 0.4 | 10 | 30 | 5 | <50 |
| A (100) | 30.0 + 9 | $CeO_2$ (2.0) | Ethanol | 3.28 | AlN $CeAlO_3$ | 170 | 1.5 | 0.6 | 10 | 30 | 10 | <100 |
| A (100) | 30.0 + 9 | $Gd_2O_3$ (1.0) | Ethanol | 3.28 | AlN $Gd_4Al_2O_9$ | 190 | 0.7 | 0.5 | 10 | 30 | 10 | <100 |
| A (100) | 30.0 + 9 | $Yb_2O_3$ (1.0) | Ethanol | 3.28 | AlN $YbAlO_3$ $Yb_2O_3$ | 170 | 0.7 | 0.6 | 10 | 30 | 5 | <70 |
| A (100) | 30.0 + 9 | $Gd_2O_3$ (0.5) $Yb_2O_3$ (0.5) | Ethanol | 3.28 | AlN Unidentified phase | 190 | 0.3 0.3 | 0.5 | 10 | 25 | 5 | <100 |
| A (100) | 30.0 + 9 | $CaCO_3$ (3) | Ethanol | 3.26 | AlN | 200 | 0.10 | 0.2 | 5 | 20 | 5 | <40 |
| A (100) | 5.0 + 8 | $Y_2O_3$ (0.7) | Ethanol | 3.39 | AlN AlON | 40 | 0.5 | 25 | 10 | 30 | 5 | <100 |
| A (100) | 30.0 + 8 | $Y_2O_3$ (0.7) | Ethanol | 3.35 | AlN AlON | 70 | 0.4 | 10 | 10 | 30 | 5 | <100 |
| A (100) | 25.0 + 8 | $Y_2O_3$ (0.7) | Ethanol | 3.32 | AlN $YAlO_3$ | 160 | | 1.0 | 10 | 30 | 10 | <70 |
| A (100) | 30.0 + 8 | $Y_2O_3$ (0.7) | Ethanol | 3.30 | AlN $Y_4Al_2O_9$ | 190 | 0.4 | 0.8 | 10 | 30 | 5 | <70 |
| A (100) | 30.0 + 10 | $Y_2O_3$ (1.0) | Ethanol | 3.27 | AlN $Gd_4Al_2O_9$ | 240 | 0.3 | 0.2 | 10 | 25 | 5 | <70 |
| A (100) | 40.0 + 8 | $Y_2O_3$ (0.7) | Ethanol | 3.25 | AlN $Y_2O_3$ | 170 | 0.4 | 0.3 | 10 | 20 | 5 | <50 |
| A (100) | 46.0 + 8 | $Y_2O_3$ (0.7) | Ethanol | 3.15 | AlN $Y_2O_3$ | 150 | 0.4 | 0.2 | 5 | 10 | 5 | <50 |
| A (100) | 30.0 + 9 | $Y_2O_3$ (10) | Ethanol | 3.35 | AlN $Y_2O_3$ | 210 | 7.7 | 0.4 | 10 | 30 | 10 | <100 |
| A (100) | 30.0 + 9 | $Y_2O_3$ (3) | Ethanol | 3.32 | AlN $Y_2O_3$ | 220 | 2.3 | 0.4 | 10 | 30 | 10 | <100 |
| D (100) | 30.0 + 8 | $Y_2O_3$ (3) | Ethanol | 3.33 | AlN $Y_4Al_2O_9$ | 190 | 2.3 | 0.5 | 50 | 100 | 100 | <500 |
| D (100) | 30.0 + 8 | $CaCO_3$ | Ethanol | 3.26 | AlN | 170 | 0.10 | 0.6 | 30 | 50 | 50 | <200 |

Note
*1 In terms of the weight of corresponding oxide.
*2 A total amount of oxygen except that assigned to the sintering aid.

Example 18

Alumina powder (B) having a purity of 99.8%, an average particle size of 0.2 μm and properties as shown in Table 5 (100 parts) was mixed with carbon black powder having an average particle size of 0.1 μm (34 parts), aluminum powder having an average particle size of 5 μm (50 parts) and $Y_2O_3$ powder having an average particle size of 0.5 μm (1 part) in the presence of ethanol (120 parts) as a dispersion medium, followed by the addition of PVB (35 parts) as a binder. Then, the mixture was molded in the form of a sheet by dry pressing and punched to form a square piece of 33 mm in length, 33 mm in width and 0.9 mm in thickness.

The molded article was heated to 1,950° C. at a heating rate of 10° C./min. up to 500° C., 2° C./min. from 500 to 1,500° C. and 10° C./min. from 1,500 to 1,950° C. in a nitrogen stream under a pressure of one atm. and kept at 1,950° C. for 3 hours to obtain a sintered body.

The sintered body had a coefficient of thermal conductivity of 180 W/mk and a specific gravity of 3.26.

According to X-ray analysis, in addition to a peak corresponding to aluminum nitride, peaks corresponding to $YAlO_3$ and $Y_4Al_2O_4$ were observed.

The sintered body contained 0.4% of impurity Y in terms of $Y_2O_3$, 0.5% of oxygen which cannot assigned to $Y_2O_3$, and 50, 50, 20 and less than 200 ppm of Fe, Si, Na and total impurity metal elements, respectively.

Example 19

To aluminum powder (100 parts) having a purity of 99.9% and an average particle size of 20 μm, $Y_2O_3$ powder (5 parts) and aluminum nitride powder (10 parts) were added followed by the addition of PVB (20 parts) as a binder in the presence of toluene (90 parts) as a solvent to form a slurry. Then, the slurry was molded in the form of a sheet by dry pressing and punched to form a square piece of 30 mm in length, 30 mm in width and 0.8 mm in thickness.

The molded article was heated to 1,800° C. at a heating rate of 10° C./min. from 500 to 1,000° C. and 50° C./min. from 1,000 to 1,800° C. in a nitrogen stream under a pressure of 1 atm. and kept at 1,800° C. for 2 hours to obtain a sintered body.

The sintered body was a white semitransparent material and had a coefficient of thermal conductivity of 190 W/mk and a specific gravity of 3.22. The oxygen content was 0.4%.

Example 20

To aluminum powder (100 parts) having a purity of 99.9% and an average particle size of 20 μm, PVB (20 parts) and DBP (10 parts) as a binder was added in the presence of toluene (100 parts) as a solvent to form a slurry. Then, the slurry was molded in the form of a sheet by dry pressing and punched to form a square piece of 30 mm in length, 30 mm in width and 0.8 mm in thickness.

The molded article was heated to 1,600° C. at a heating rate of 10° C./min. from 500 to 1,000° C. and 50° C./min. from 1,000 to 1,600° C. in a nitrogen stream under a pressure of 1 atm. and kept at 1,600° C. for 2 hours to obtain a sintered body.

The sintered body was a white semitransparent material and had a coefficient of thermal conductivity of 170 W/mk and a specific gravity of 3.22. The oxygen content was 0.8%.

What is claimed is:

1. A method for producing a sintered body of aluminum nitride which comprises steps of:

mixing alumina powder having a purity of not lower than 99.0% and an average particle size of not larger than 2 μm with 10 to 100 parts by weight of carbon or a compound which liberates carbon by heating in terms of carbon per 100 parts by weight of alumina, molding the mixture and sintering the molded mixture at a temperature of 1,600 to 2,200 ° C. in an atmosphere containing nitrogen to produce the sintered body of aluminum nitride which has an average particle size of not larger than 5 μm.

2. The method according to claim 1, wherein the amount of the carbon or the compound which liberates carbon by heating is from 20 to 100 parts by weight per 100 parts by weight of alumina.

3. The method according to claim 1, wherein alumina is further mixed with 0.01 to 50 parts by weight of at least one additive selected from the group consisting of aluminum nitride powder, aluminum powder, compounds of the IIa and IIIa elements of the Periodic Table in terms of their oxide per 100 parts by weight of alumina.

4. The method according to claim 3, wherein the amount of said additive is from 0.1 to 50 parts by weight per 100 parts by weight of alumina.

5. A method for producing a sintered body of aluminum nitride comprising steps of:

molding aluminum powder having a purity of not lower than 99.0% and an average particle size of not larger than 50 μm and sintering the molded aluminum powder at a temperature of 1,600 to 2,200° C. in an atmosphere containing nitrogen to produce the sintered body of aluminum nitride which has an average particle size of not larger than 5 μm.

* * * * *

UNITED STATES PATENT AND TRADEMARK OFFICE
CERTIFICATE OF CORRECTION

PATENT NO. : 5,036,026
DATED : July 30, 1991
INVENTOR(S) : Akira Yamakawa et al It is certified that error appears in the above-identified patent and that said Letters Patent is hereby corrected as shown below:

ON THE TITLE PAGE, ITEM [75]

Please add:

The Fourth inventor is missing, before "all of" insert the following:
    --Masaya Miyake, --.

Signed and Sealed this

Second Day of February, 1993

*Attest:*

STEPHEN G. KUNIN

*Attesting Officer*    *Acting Commissioner of Patents and Trademarks*